Patented May 27, 1941

2,243,484

UNITED STATES PATENT OFFICE 2,243,484

PROCESS FOR THE PREPARATION OF MONOHALOGENATED KETONES

Glen H. Morey, Terre Haute, Ind., assignor to Commercial Solvents Corporation, Terre Haute, Ind., a corporation of Maryland No Drawing. Application April 28, 1939, Serial No. 270,662

8 Claims. (Cl. 260—593)

My invention relates to an improved process for halogenating ketones. More particularly, it pertains to a process for the chlorination or bromination of aliphatic ketones in which the monochloro or monobromo derivative is chiefly produced.

The halogenation of ketones by the customary methods is highly undesirable for a number of reasons. For example, instead of obtaining a single compound, as is usually desired, there are generally produced varying quantities of several compounds, the number and character of which depend upon the compound being halogenated and the specific reaction conditions employed. Where a number of such compounds are produced, as a rule, the difficulty of their separation increases in proportion to their number. Obviously, therefore, where only a single halogenated compound is desired, the reduced yield and the increased difficulty in recovering the required compound add considerably to its cost of production.

In the case of the chlorination of acetone, for example, there are at least three products formed, namely, monochloroacetone, symmetrical dichloroacetone, and unsymmetrical dichloroacetone, the amount of the former predominating over that of the two isomeric dichloro compounds if the use of an excess of chlorine is avoided in the chlorination. The symmetrical dichloroacetone present in the reaction mixture is easily separated from the other reaction products by distillation. However, the separation of the unsymmetrical dichloroacetone from the monochloroacetone is extremely difficult, due to the fact that it boils at essentially the same temperature as monochloroacetone. Due to this reason, a mixture of these two compounds will behave similar to a pure compound when subjected to distillation. Unless, therefore, a chlorine analysis of the reaction mixture is made, it is quite possible to overlook the presence of a small amount of unsymmetrical dichloroacetone. Frequently in the preparation of monochloroacetone from commercial acetone there is as much as 15 mole percent of the unsymmetrical dichloroacetone formed. Thus it is seen that in producing monochloroacetone from commercial grades of acetone a substantial amount of unsymmetrical dichloroacetone may be present although the reaction mixture behaves as a pure compound, having a boiling range of not more than 1° C.

I have now found that it is possible to chlorinate or brominate aliphatic ketones in a manner to produce high yields of monochloroketones or monobromoketones which are substantially free from the corresponding di-substituted compounds. This method consists essentially of carrying out the chlorination or bromination operation in the presence of less than 0.05% by weight of water, based on the total weight of the reactants. I have found that the presence of substantially greater amounts of moisture increases to a marked degree the formation of di-substituted products at the expense of the desired mono-substituted products.

The commercial grades of ketones, such as, for example, acetone, which are commonly regarded as dry, normally actually contain amounts of water substantially in excess of the amount which I have found to be essential for the production of substantially pure monochloroketones. The best grades of commercial acetone, for example, usually contain approximately 0.3% of water, an amount substantially in excess of that which I have found to be essential for the production of substantially pure monochloroacetone or monobromoacetone, even if completely anhydrous chlorine or bromine is employed in the reaction.

The moisture content of ketones for use in my process may be conveniently removed or reduced to the desired extent by any of the well known methods. For example, dehydration may be satisfactorily effected by adding a third substance to the wet ketone, from which, on distillation the water is removed in the form of an azeotropic mixture. Or, if preferred, the acetone may be satisfactorily dried by the use of any of the common dehydrating agents such as silica gel.

Since the total amount of moisture present in the reaction mixture is the critical factor of my process, it is usually desirable to dry the chlorine or bromine to be used in the process, since obviously the effect of drying the ketone would be partially or even completely lost by using wet chlorine or bromine which would introduce into the reaction mixture amounts of moisture in excess of 0.05% by weight. The desired drying of the chlorine or bromine may also be satisfactorily accomplished by any known procedure. For example, chlorine may be passed through strong sulfuric acid, and, similarly, bromine may be vaporized and passed through warm concentrated sulfuric acid. By drying both the ketone and the chlorine or bromine prior to the reaction, I have succeeded in obtaining products which are chiefly mono-substituted compounds, and which contain a very low percentage of disubstituted compounds.

The advantage of employing reaction conditions which are as nearly anhydrous as possible, is illustrated in the following table, in which is shown the effect of various concentrations of water in a chlorine-acetone reaction mixture, on the purity of the monochloroacetone produced therefrom.

| Percent $H_2O$ by weight in reaction mixture | Mole percent unsymmetrical dichloroacetone present as impurity |
| --- | --- |
| 0.140* | 14.5 |
| 0.070 | 7.8 |
| 0.046 | 9.6 |
| 0.023 | 1.87 |
| 0.023 | 1.4 |
| 0.023 | 1.0 |
| 0.023 | 0.0 |

*Prepared from commercial acetone and anhydrous chlorine.

It may be seen from the above table that in carrying out this reaction, it is highly desirable that substantially anhydrous conditions be employed. Although monochloroacetone containing a desirably low percentage of unsymmetrical dichloroacetone may be produced from a mixture of chlorine and acetone having a moisture content of between 0.02% and 0.05% by weight, I prefer to employ a mixture thereof in which the moisture content is not substantially above 0.02% by weight.

In addition to obtaining a product of a much higher degree of purity, I have also found that the use of my improved procedure gives a product which is more stable than that produced by the prior art procedures, which employ reactants of comparatively high moisture content. For example, in the case of monochloroacetone, when prepared from acetone containing a relatively high percentage of water, there is an increased tendency for the product to darken and polymerize, apparently being caused by the presence of moisture in the starting materials, which catalyzes the formation of products tending to hasten deterioration of the monochloroacetone.

Ketones which may be utilized in the present invention are the aliphatic ketones, and especially those which are capable of being halogenated in the alpha position. By way of example, ketones other than acetone which are particularly applicable to my invention, are methylethylketone, methylpropylketone, 3-pentanone, and the like.

The chlorination or bromination of ketones in accordance with my present invention may be carried out by means of any known procedure for the halogenation of ketones which may be adapted to substantially anhydrous operating conditions. In general, I prefer to vaporize an anhydrous ketone and to introduce chlorine, or bromine vapors, simultaneously therewith, into a suitable reaction chamber. The step of vaporizing the dehydrated ketone, prior to the introduction thereof into the reaction chamber, may be accomplished in any convenient manner, as for example, by means of a steam vaporizer. In effecting the reaction, it is desirable that an excess of the ketone be present in the vapor phase at all times, since such conditions tend to favor the increased formation of the mono-substituted product. A 5% excess of the ketone over the theoretical requirement for the production of the mono-substituted product is usually sufficient for this purpose. Likewise, it is desirable that no halogenation catalysts be present in the reaction chamber if the monosubstituted derivative is the preferred product.

The temperature employed in the present invention may vary within wide limits. Any temperature which is sufficient to maintain the unreacted ketone in the vapor phase but insufficient to cause decomposition of said ketone or of the reaction product, at the space velocity and pressure utilized, is applicable to my invention. However, when relatively high temperatures are employed, there is an increased tendency for poly-substituted derivatives to be produced. Therefore, the use of high temperature is not usually desirable when the mono-substituted derivative is the preferred product. If elevated temperatures are employed, the contact time in the reaction chamber should be comparatively short, for if such time is allowed to be extended, the production of poly-substituted ketones is not only increased, but decomposition of the unreacted ketone and the reaction products sets in, as well. For this reason, a relatively high space velocity should be employed when carrying out the reaction of the present invention at high temperature. For the present purpose I have found, however, that the reaction is more satisfactorily effected at lower temperatures, i. e., slightly above the boiling point of the ketone being reacted. Another advantage in carrying out my process within a lower range of temperature is the fact that the reaction product may be effectively and economically removed from the reaction zone in the liquid state, as formed. Because of these advantages in operating at lower temperatures I prefer to employ a temperature which is at least equal to the boiling point of the ketone employed and below the boiling point of the resulting reaction product. For example, in the chlorination of acetone, temperatures of from 56–115° C. have been found to be particularly suitable for the production of primarily monochloroacetone.

The apparatus employed in carrying out my process is not a critical part of my invention, and types of apparatus previously used for vapor phase halogenation reactions may be satisfactorily employed. A suitable type of apparatus comprises means for vaporizing the ketone, means for introducing the ketone vapors, together with chlorine or bromine vapors, into the reaction chamber, and means for controlling the temperature in the reaction chamber in such a manner that the unreacted ketone is maintained in the vapor phase and the reaction product may be removed by condensation from the zone of reaction, as formed.

My invention may be more specifically described by the following example:

Dry acetone (not more than .05% water by weight), was vaporized in a steam vaporizer and then passed, in the absence of a halogenating catalyst, into the chlorination chamber at a temperature which was sufficient to maintain the acetone in the vapor phase but below the boiling point of monochloroacetone. Chlorine gas, after having been carefully dried to a substantially completely anhydrous condition by scrubbing with concentrated sulfuric acid, was introduced into the chlorination chamber through a suitable tube, at a rate such that the concentration of chlorine was less than that of the acetone. The monochloroacetone was condensed in the reaction chamber, as formed, and was separated from the unreacted acetone by allowing the chlorinated product to flow downward through a steam-jacketed tube into a receiver. The product obtained in this manner boiled at 118–119° C./760 mm. and was found to contain 38.66% chlorine by weight, thus denoting that unsymmetrical dichloroacetone was present as an impurity to the extent of 1 mole per cent.

Although I have mentioned the preferred features of the apparatus employed in carrying out my invention, I do not desire to be limited thereto, since it will be apparent to those skilled in the art, that such features are subject to various modifications and have numerous equivalents which will attain similar results. For example, vapors of the ketone and gaseous chlorine or bromine may be reacted in a suitable reaction vessel at a temperature above the boiling point of the reaction products. In such instances the vapors containing the unreacted ketones and the chlorinated products may be conducted into a second vessel, or receiver, and the chlorinated ketone separated by condensation as described in the above example.

In addition to modifying the preferred features of the apparatus, it will also be obvious that various methods may be employed in effecting the chlorination or bromination reaction in accordance with the present invention. For example, instead of continuously maintaining the unconverted ketone in the reaction chamber in the vapor phase, it may be passed from said reaction chamber into a suitable condenser, and allowed to collect in a temporary storage tank, from which it is subsequently led into the vaporizer and used in a succeeding cycle.

While I have only specifically described the chlorination of acetone, by way of example, it is to be understood, however, that I also include within the scope of my invention the chlorination or bromination of any of the other aliphatic ketones, and especially the aliphatic keones capable of being halogenated in the alpha position. In general, it may be stated that the use of any equivalents or any modifications of procedure which would occur to one skilled in the art is included in the scope of my invention.

My invention now having been described, what I claim is:

1. In a process for the production of halogenated aliphatic ketones, the step which comprises reacting, in the vapor phase, a mixture of an aliphatic ketone and a halogen chosen from the class consisting of chlorine and bromine, said mixture having a moisture content of less than 0.05%, based on the weight of the total mixture.

2. In a process for the production of monohalogenated aliphatic ketones, the steps which comprise reacting, in the vapor phase, in a heated reaction zone, a mixture of an aliphatic ketone and a halogen of the class consisting of chlorine and bromine, said mixture containing an excess of ketone over the amount theoretically required for the production of the mono-halogenated product, and said mixture having a moisture content of less than 0.05% based on the weight of the total mixture, and removing the reaction product from said zone of reaction, as it is formed.

3. In a process for the production of monochlorinated aliphatic ketones, the steps which comprise introducing a mixture of chlorine and an aliphatic ketone having a moisture content of less than 0.05% based on the total weight of the mixture, into a reaction zone maintained at a temperature which is at least equal to the boiling point of the ketone, and below the boiling point of the chlorinated ketone being produced, and removing the chlorinated ketone from the zone of reaction, as it is formed.

4. In a process for the production of monochloroacetone, the step which comprises reacting a mixture of chlorine and acetone in the vapor phase, said mixture having a moisture content of less than .05% based on the total weight of the mixture.

5. In a process for the production of monochloroacetone, the step which comprises reacting in a heated reaction zone, a mixture of chlorine and acetone in the vapor phase, said mixture having a moisture content of less than .05% based on the total weight of the mixture, and removing the chlorinated acetone from the said zone of reaction as it is formed.

6. In a process for the production of monochloroacetone, the step which comprises introducing chlorine and acetone, in the vapor phase, into a heated reaction chamber, the resulting mixture of chlorine and acetone having a moisture content of less than 0.05% based on the total weight of said mixture, and removing the chlorinated acetone from the zone of reaction as it is formed.

7. In a process for the production of monochloroacetone, the step which comprises introducing a mixture of chlorine and acetone, containing an excess of acetone over the theoretical amount required for the production of monochloroacetone and having a moisture content of not substantially greater than 0.02% based on the total weight of said mixture, into a reaction zone maintained at a temperature of 56–115° C., and removing the liquid chlorinated acetone from the zone of reaction as it is formed.

8. A process for the production of chlorinated acetone, comprising reacting a mixture of chlorine and acetone in the vapor phase, in which the moisture content of said mixture is less than .05% based on the total weight of the mixture.

GLEN H. MOREY.